United States Patent [19]
Stein

[11] Patent Number: 4,619,089
[45] Date of Patent: Oct. 28, 1986

[54] BUILDING STRUCTURE

[76] Inventor: Alejandro Stein, Residencias Sierra Nevada, Calle Chula Vista, Chula Vista Las Mercedes, Caracas, Venezuela

[21] Appl. No.: 738,491

[22] Filed: May 28, 1985

Related U.S. Application Data

[63] Continuation of Ser. No. 463,405, Feb. 7, 1983, abandoned.

[51] Int. Cl.[4] .............................................. E04B 1/10
[52] U.S. Cl. .................................... 52/233; 403/326; 403/382
[58] Field of Search ................. 52/233; 403/326, 382, 403/345–347; 138/154; 24/339; 312/111, 140, 257 SK

[56] References Cited

U.S. PATENT DOCUMENTS

| 378,769 | 2/1888 | Coas | 138/154 |
| 2,112,247 | 3/1938 | McLaughlin | 46/29 |
| 2,644,475 | 7/1953 | Morton | 403/326 |
| 3,746,050 | 7/1973 | Born et al. | 138/154 |
| 3,919,819 | 11/1975 | Oliver | 403/382 |
| 4,147,001 | 4/1979 | Oliver | 52/233 |

FOREIGN PATENT DOCUMENTS 75780  6/1976  Australia .............................. 52/233

Primary Examiner—James L. Ridgill, Jr.
Attorney, Agent, or Firm—Cooper, Dunham, Griffin & Moran

[57] ABSTRACT

A building structure including a plurality of horizontally disposed hollow tubular structural members stacked to form walls joined at a corner, a method of constructing the same, and a wall member, and end connector for a wall member, utilized therein. In one form of the invention, wall members are formed of hollow metal tubes each having affixed to at least one end an end connector having a notch for interlocking with a like end connector of at least one intersecting, abutting wall member.

8 Claims, 14 Drawing Figures

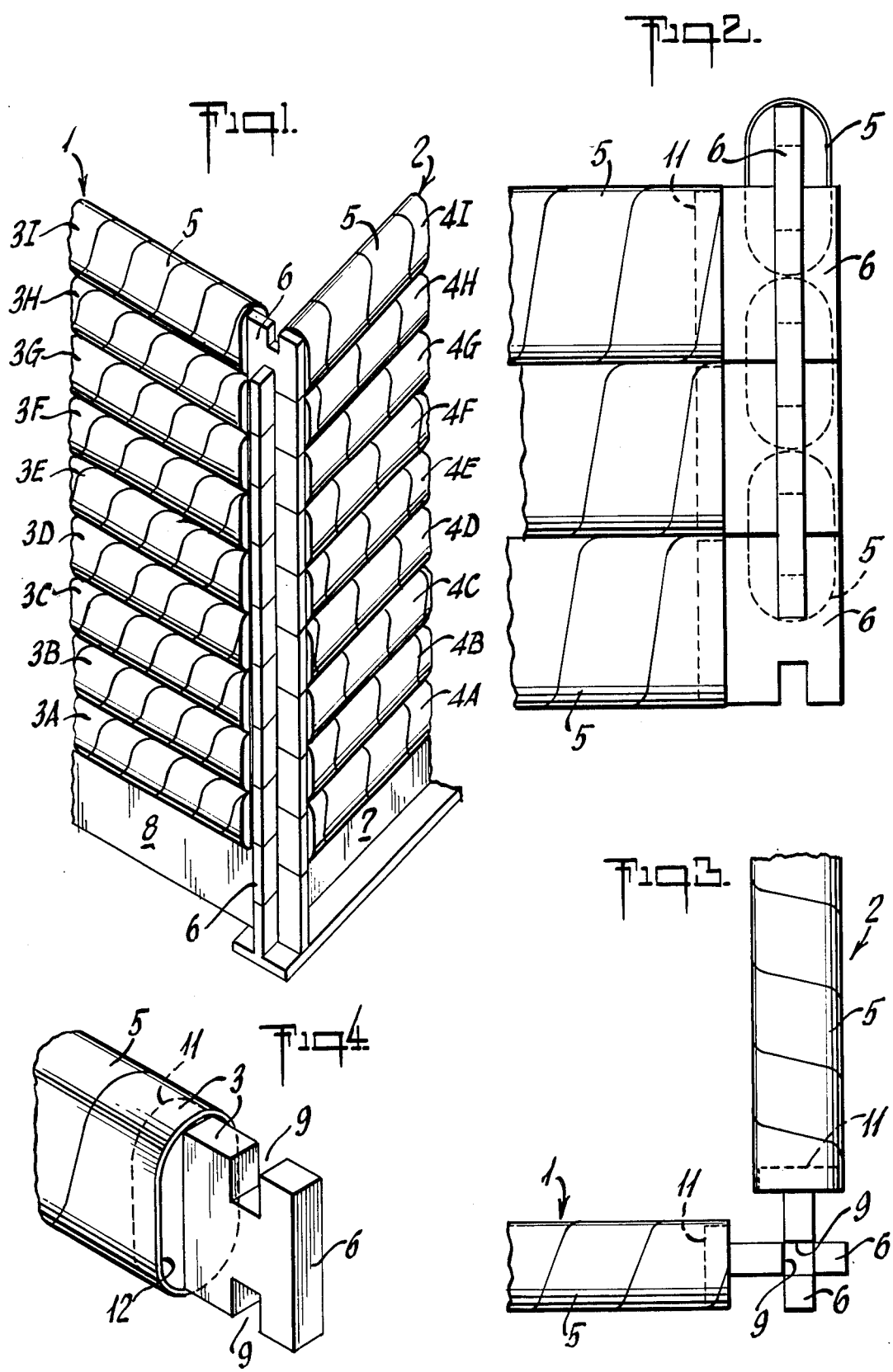

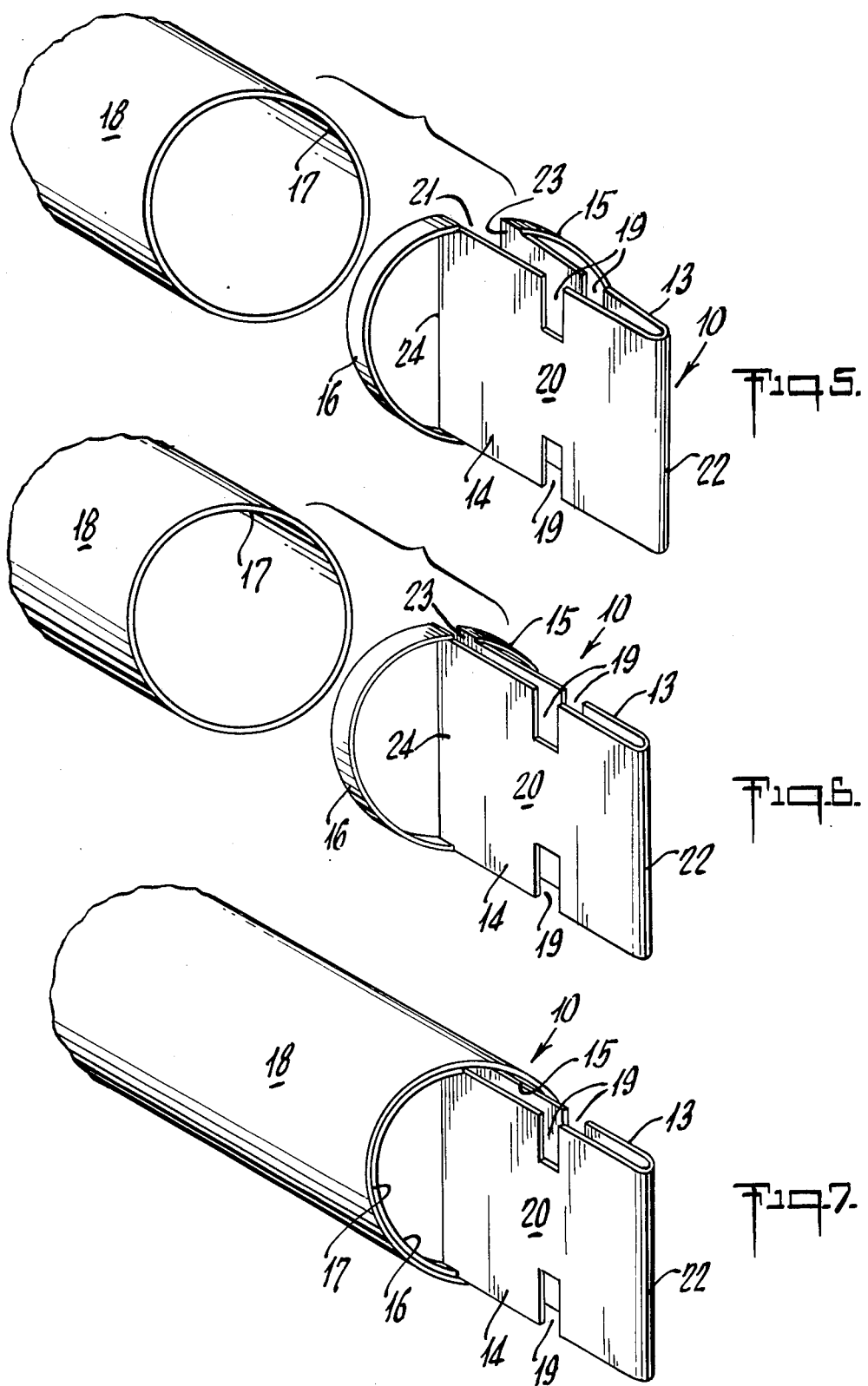

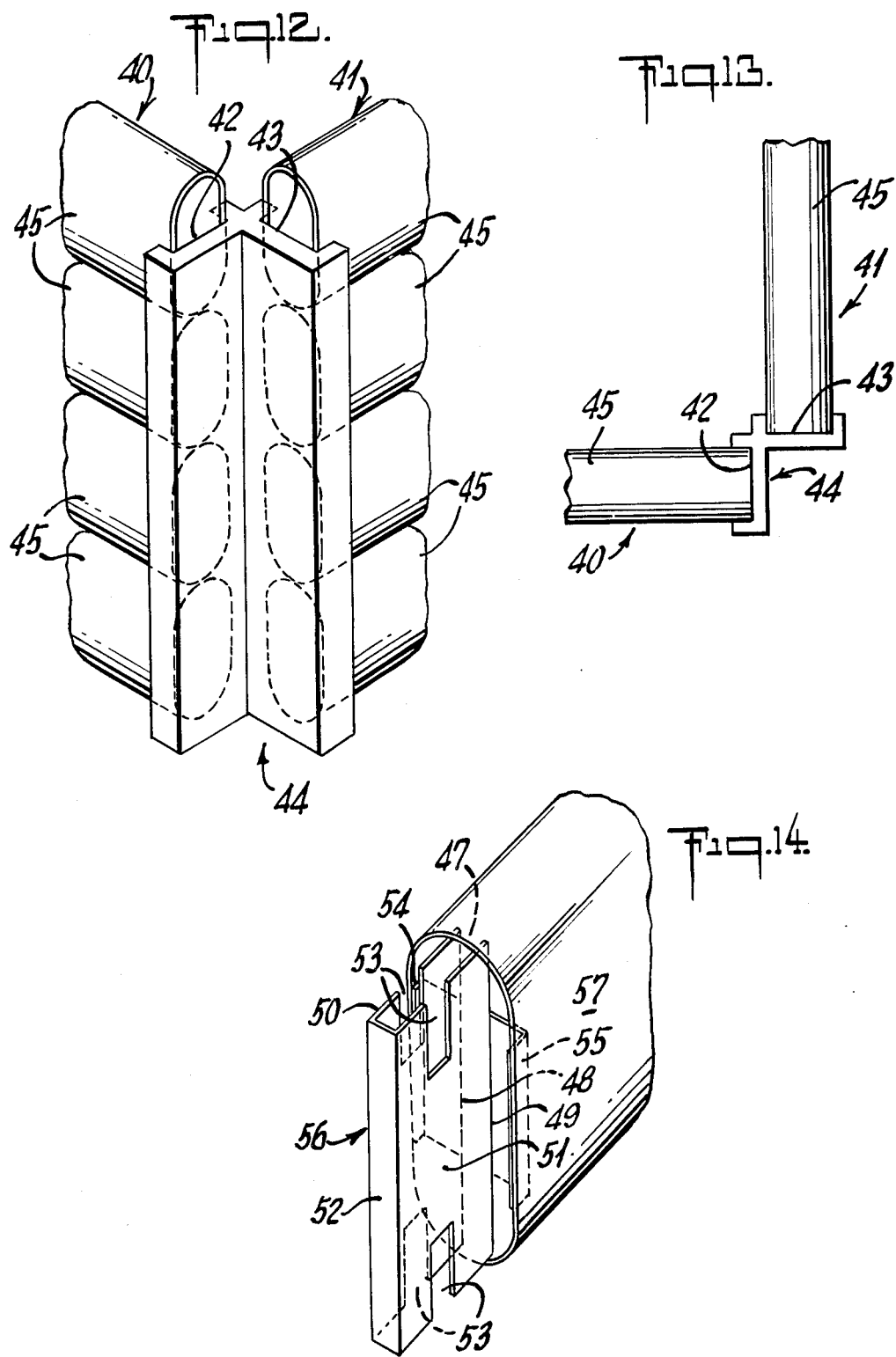

4,619,089

BUILDING STRUCTURE

This is a continuation of application Ser. No. 463,405, filed Feb. 7, 1983, now abandoned.

BACKGROUND OF THE INVENTION

This invention relates to building construction, and more particularly, to a building structure of intersecting hollow tubular structural members, a method of constructing the same, and a wall member and end connector utilized therein.

As a result of the population explosion and the increasingly high cost of housing, there currently exists a housing shortage of increasing proportions. In the recent past, attempts have been made to provide, standardized and/or prefabricated building components and housing modules in order to provide cheaper, more easily constructed housing. While many forms of structures have been provided, the assembly of components and erection of the structure have required considerable skill, particularly for those structures intended for or most suited to mass production and widespread utilization. Moreover, most prefabricated building components have taken the form of semi-finished walls, or room or unit modules fabricated in a manufacturing plant and later transported to a building site. Such approaches involve significant transportation problems and associated costs.

It is known to construct building structures of interfitted wall members, particularly logs or timber. See, for example, U.S. Pat. Nos. 3,304,674; 2,473,017; 2,473,018; and 3,304,674. The log wall members, however, are generally of substantial weight, while both the log and timber type wall members have required either sophisticated milling and machining operations or extensive manual labor and skill in cutting and shaping the components. Production of such wall members is relatively costly nd generally not compatible with on-site fabrication, except for the more unsophisticated, rough log wall members. Erection of such structures has involved considerable time, manpower and materials. Additionally, substantial expense is involved in transporting such materials to the construction site; moreover, log or timber wall members, by their nature, displace a substantial volume, requiring a significant transport capability in moving the components to the building site.

SUMMARY OF THE INVENTION

It is an object of this invention to achieve a building that is relatively simple and inexpensive to construct, and which may be assembled from mass produced, standardized components with greater speed and economy than has been possible with prior structures and methods, and a method for constructing the same.

Another important object is to provide component building parts which are durable and relatively lightweight, such that they can easily be handled by one or two persons, and which may be sold as an unassembled kit because the building is relatively simple for the purchaser to erect.

Another important object is to provide a building structure and method of construction compatible with high volume, on site building production, such that the wall members may be fabricated either at the building site or in a temporary fabrication facility established nearby, and such that the structure itself might be assembled either on site, or in a nearby fabrication facility from which it might be transported by crane or the like to the construction site, thus providing significant economy in the transportation of raw materials to the constructin site and substantially lower construction costs.

Another important object is to provide easily assembled component building parts which are particularly suitable for use in erecting single, multi-room and/or multi-unit structures of one to four stories in height which are suitable for use in erecting building structures for housing commercial, industrial or agricultural applications.

Another important object is to provide a durable, light-weight, easily assembled and disassembled wall structure.

BRIEF DESCRIPTION OF THE DRAWINGS

FIG. 1 is a fragmentary, perspective view of a corner of a building structure showing a pair of walls constructed of interlocking wall members shaped and assembled in accordance with this invention;

FIG. 2 is an enlarged, fragmentary, side view of a corner of a building structure showing a pair of walls constructed of interlocking wall members shaped and assembled in accordance with this invention;

FIG. 3 is a top view of FIG. 2;

FIG. 4 is a fragmentary, perspective view of one end of a wall member having an oblong cross section and showing one embodiment of an end connector according to the invention;

FIG. 5 is a fragmentary, perspective, exploded view of a wall member prior to assembly, including a hollow tube having a substantially circular cross-section and another embodiment of an end connector according to the invention;

FIG. 6 is a fragmentary, perspective, exploded view of the wall member of FIG. 5 about to be assembled;

FIG. 7 is a fragmentary, perspective view of the wall member of FIGS. 5 and 6, assembled in accordance with this invention;

FIG. 12 shows a fragmentary, perspective view of another embodiment of a building structure constructed according to this invention, showing a vertical member having vertical grooves for receiving and retaining the abutting ends of a pair of walls;

FIG. 13 shows a top fragmentary view of the corner construction of FIG. 12;

FIG. 14 shows a fragmentary, perspective view of one end of a wall member having an oblong cross section and showing another embodiment of an end connector according to the invention.

DETAILED DESCRIPTION

Figure 8:
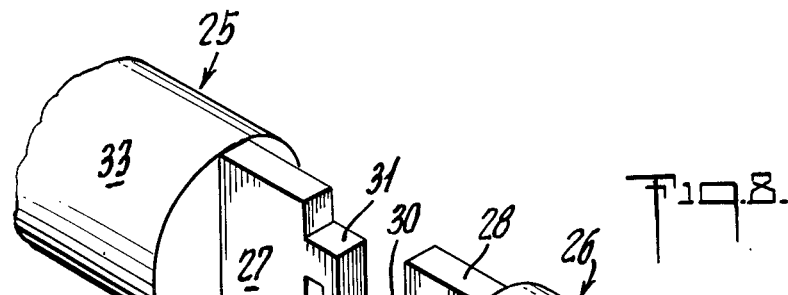
FIG. 8 is a fragmentary, perspective, exploded view of two wall members about to be interconnected.

FIG. 1 illustrates the corner construction of a building structure assembled according to the invention, which consists generally of a pair of intersecting walls 1 and 2. The wall 1 includes a plurality of horizontally disposed wall members referred to by 3. The wall 2 includes a plurality of horizontally disposed wall members referred to by 4. In the embodiment of FIG. 1, the wall members 3 and 4 each include a hollow tubular structural member 5 and an end connector 6. Preferably, hollow tube 5 is made of metal, particularly steel, although it will be appreciated that the tube 5 might be composed of any one or more of a variety of metal, plastic, synthetic or natural fiber, or paper materials. In constructing a building according to this invention, it is preferable that the hollow tube 5 be formed by spirally wrapping steel plating.

It will be appreciated that the building structure may be supported in a variety of ways. For example, any one of a number of types of foundations or supports may be utilized. For ease of assembly, foundation support members 7 and 8 are provided, as illustrated in FIG. 1.

In the preferred embodiment, the hollow tube has a substantially oblong cross-section, as shown in FIG. 1–4, and as best seen in FIG. 2. In an analogous way, the hollow tube might have a circular cross-section, as best seen in FIG. 5–7. It will be appreciated that various cross-sectional shapes may be utilized.

As will become apparent upon later description of the components and their assembly, hollow metal tubes having a circular cross-section may be deformed to form tubes having an oblong cross-section to produce wall members, which, when horizontally disposed as shown in FIGS. 1 and 2, are thinner but of greater height than the original circular tubes. Consequently, greater wall height may be achieved or, conversely, fewer oblong cross-section wall members than circular cross-section wall members of the same surface area are required to achieve a given height.

According to the invention, each end connector is provided with a means for securely attaching to at least one other end connector. In the preferred embodiment, each end connector is provided with at least one, and preferably two or more notches for receiving and interlocking with an end connector of an intersecting, abutting wall member. In the embodiment of FIG. 1, each end connector 6 is provided with a pair of notches, best seen and referred to as 9 in FIG. 4. It will be readily understood that the end connector may be provided with a variety of means for securely attaching to the attachment means of a second end connector. For example, the end connectors of intersecting abutting wall members which are stacked alternately may be provided with identical male-female mating means. Similarly, the end connectors of intersecting, abutting wall members which are stacked alternately to form two walls may be provided in one wall with male-male mating means and in the intersecting second wall with the female-female mating means.

The wall members 3 and 4 of FIG. 1 are assembled in an alternating, interlocking fashion to form the structure illustrated in FIG. 1. Thus, wall member 4A of wall 2 is placed on foundation support member 7 first. Then, wall member 3A of wall 1 is placed on foundation support member 8, with its associated end connector 6 being received and retained by like end connector 6 of wall member 4A by inserting the downwardly disposed notch 9 of end connector 6 of wall member 3A into the upwardly disposed notch 9 of like end connector 6 of wall member 4A, thus interlocking wall members 3A and 4A. Similarly, wall member 4B is placed upon wall member 4A, with its associated end connector 6 being received and retained by like end connector 6 of wall member 3A. It will be readily understood that each superjacent wall member of walls 1 and 2 is alternately stacked in the manner described.

In the embodiment of the building structure according to this invention as illustrated in FIG. 1, it is preferable that vertical load bearing is provided by the interlocked, superjacent end connectors 6 of wall members 3 and 4, thus allowing hollow tubes 5 to be substantially non-load bearing and thus to be economically formed of relatively thin, lightweight material. Additional vertical load bearing members may of course be provided, preferably proximate to any structural aperture frames provided to the building structure for windows, doorways or the like.

The building structure may, of course, be provided with windows, doorways and the like. For example, window or doorway frames having a means for receiving and retaining the ends of the hollow tubes easily may be provided to a building structure according to this invention. Where tubular members pass below or above such frames, the top and/or bottom of such frames may advantageously present a trough or groove in which said tubular member might be partially seated.

In the embodiment of FIG. 4, end connector 6 is formed with a plug portion 11 having a cross-section substantially equivalent to the cross-section of the edge 12 of the inner surface of hollow tube 5. Wall member 3 is formed by seating plug 11 fully within hollow tube 5, thus affixing end connector 6 to hollow tube 5. In the preferred embodiment, end connector 6 is metal, preferably steel, and may be further secured to hollow tube 5 in a variety of ways, such as by spot welding plug 11 to hollow tube 5. It will be appreciated that plug 11 may be solid or hollow formed, and it will easily be understood that affixation of the end connector to the hollow tube may be accomplished in a variety of ways.

FIGS. 5 to 7, inclusive, illustrate another embodiment of a wall member, and of an end conector for a wall member, according to this invention. A tongue 20, formed of folded sheet metal, preferably steel, has an open end 21 formed by edges 23 of side panel 13 and 24 of side panel 14, and a closed end 22. The tongue 20 is provided with at least one and preferably more notches 19 for receiving and retaining an intersecting wall member. Mounted at edges 23 and 24 are metal bands 15 and 16 respectively, bands 15 and 16 together substantially conforming to the cross section presented by the edge 17 of the inner surface of hollow metal tube 18.

In the embodiment of FIGS. 5 to 7, metal band 16 is mounted at the corners of edge 24 in a plane perpendicular to the plane of side panel 14 of tongue 20. Similarly, metal band 15 is mounted at the corners of edge 23 in a plane perpendicular to the plane of side panel 13 of tongue 20. It will be appreciated that other angular relationships are readily possible.

FIG. 5 illustrates the end connector 10 prior to affixation to hollow tube 18. As shown in FIG. 5, side panels 13 and 14 of tongue 20 are in a spaced relationship such that bands 15 and 16 are not insertable into hollow tube 18. As seen in FIG. 6, when pressure is applied to side panels 13 and 14 of tongue 20 to compress edges 23 and 24 closer together, bands 15 and 16 are brought closer together and are insertable into hollow tube 18. As seen in FIG. 7, when the pressure on side panels 13 and 14 is released, side panels 13 and 14 return partially to their original spaced relationship until bands 15 and 16 firmly engage the inner surface of hollow tube 18 around its cross-section 17. It will be appreciated that cross-section 17 may be of a variety of shapes. In the preferred embodiment, hollow tube 18 would present an oblong cross-section, best seen as hollow tube 5 in FIG. 4, and in that case bands 15 and 16 of the end connector together would of course present a substantially conforming oblong cross-section.

Figure 9:
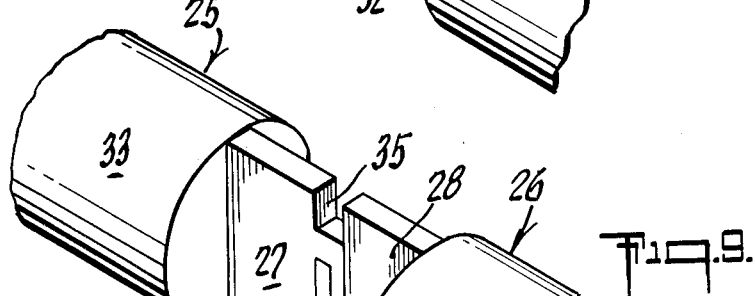
FIG. 9 is a fragmentary, perspective view of two wall members interconnected by their respective end fittings.
Figure 10:
FIG. 10 shows a fragmentary, perspective view of two wall members interconnected by their respective end fittings and further interlocked with the end connector of a third wall member.
Figure 11:
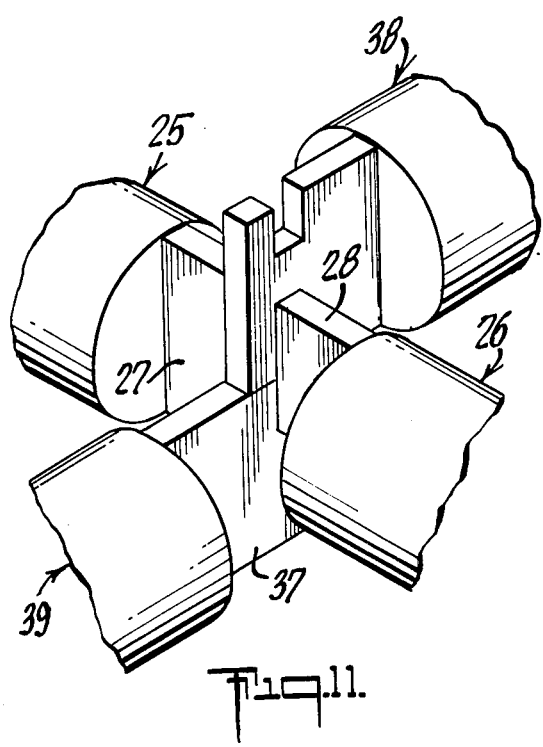
FIG. 11 shows a fragmentary, perspective view of two wall members interconnected by their respective end fittings and further interlocked with the respective end connectors of a third and a fourth wall member.

FIGS. 8 and 9, inclusive, illustrate the manner of interconnecting two wall members, referred to as 25 and 26, in forming a continuing wall. As shown here, an end fitting 27 is affixed to the end of hollow tube 33; similarly, an end fitting 28 is affixed to the end of hollow tube 34. End fitting 27 is provided with notch 29 for interconnecting with notch 30 of end fitting 28. In the embodiment of FIG. 8, notch 29 is formed by the L-shaped finger 31 of end fitting 27. Similarly, notch 30 is formed by the L-shaped finger 32 of end fitting 28. It will be understood that FIG. 8 illustrates merely one, but by no means all configurations for providing end fittings 27 and 28 with a means for securely attaching one to the other. In the embodiment of FIGS. 8 and 9, when end fittings 27 and 28 are interconnected, notches 35 are formed, which preferably are suitable for receiving and interlocking in an angular relationship with wall members having end connectors as, for example, heretofore described in reference to FIGS. 1 to 4, inclusive. FIGS. 10 and 11, inclusive, illustrate the manner of interlocking wall members 25 and 26 having end fittings 27 and 28, respectively, with wall members 38 and 39 having end connectors referred to as 36 and 37, respectively.

FIG. 1 illustrates one embodiment of a building structure, according to the invention, in which the means for receiving and retaining the abutting ends of intersecting wall members 3 and 4 comprises the interlocked end connectors 5.

FIGS. 12 and 13, inclusive, illustrate yet another embodiment of a means for receiving and retaining hollow tubular structural members to form a corner. In the embodiment of FIG. 12, a plurality of hollow tubes 45 each having an oblong cross-section are stacked to form walls 40 and 41. Of course, the hollow tubes may be provided with a different cross-sectional shape. The abutting ends of hollow tubes 45 of walls 40 and 41 are received and retained by grooves 42 and 43 of vertical member 44, grooves 42 and 43 being wider than the width of hollow tubes 45. Vertical member 44 may be of solid or hollow construction, and is preferably composed of steel. It will be appreciated that vertical member 44 may be provided with additional grooves for receiving and retaining hollow tubes disposed so as to comprise additional walls.

FIG. 14 illustrates another embodiment of a wall member, and of an end connector for a wall member, according to the invention. In the embodiment of FIG. 14, the wall member consists of hollow tube 57 and end connector 56. A tongue 46, formed of folded sheet metal, preferably steel, has an open end 47 formed by edges 48 of side panel 50 and 49 of side panel 51, and a closed end 52. The tongue 46 is provided with at least one and preferably more notches 53 for receiving and retaining an intersecting wall member. Mounted at edges 48 and 49 are L-shaped members 54 and 55 respectively.

In the embodiment of FIG. 14, the stem of L-shaped member 54 is mounted at edge 48 in a plane perpendicular to the plane of side panel 50. Similarly, the stem of L-shaped member 55 is mounted at edge 49 in a plane perpendicular to the plane of side panel 51. It will be appreciated that other angular relationships are readily possible.

FIG. 14 illustrates the end connector 56 affixed to hollow tube 57. Prior to affixation of the end connector 56, as fully described heretofore with respect to the embodiment of an end connector as illustrated in FIGS. 5 to 7, inclusive, side panels 50 and 51 of tongue 46 may be in a spaced relationship such that L-shaped members 54 and 55 are not insertable into hollow tube 57 until pressure is applied to side panels 50 and 51 to compress edges 48 and 49 closer together. After insertion of the open end 47 into the hollow tube 57 and when the pressure on side panels 50 and 51 is released, side panels 50 and 51 return partially to their original spaced relationship until the bases of L-shaped members 54 and 55 firmly engage the inner surface edge of hollow tube 57.

A wall in a building structure according to this invention is formed of horizontally disposed superjacent hollow tubular structural members, and means for fixing and retaining said wall members at at least one end.

According to the method of this invention, a plurality of hollow tubular structural members are formed. Preferably, the plurality of hollow tubular structural members are formed of metal; such tubes may be formed by a variety of methods and apparatus already well known. In the preferred embodiment, hollow tubes having a circular cross-section are formed by spirally wrapping steel plating. The circular cross-section tubes may then be deformed to form a tube having a substantially oblong cross-section.

Methods and apparatus for forming spirally wrapped tubes having a circular cross-section from lengths of metal plating are, of course, well known in the construction trade, particularly in fabricating tubes and ducts for air conditioning, ventilation or heating conduits. Methods and apparatus for compressing such circular cross-section tubes to form an oblong cross-section are similarly well known.

Following the formation of a plurality of hollow tubular structural members, said hollow tubular structural members are stacked, one upon another, to form at least two walls joined at a corner. The abutting ends of the hollow tubular structural members of the two walls may be joined by a vertical member having vertical grooves for receiving and retaining the abutting ends of said wall members. Preferably, the walls are joined by means of an end connector affixed to the end of each hollow tubular structural member, said end connector having a means for securely attaching to the end connector affixed to an intersecting, abutting hollow tubular structural member.

This invention will be seen to provide a building structure which is relatively simple and economical to construct. It will be readily understood that multi-room and multi-level buildings of various designs and shapes may be constructed utilizing the wall members, end connectors and end fittings provided by this invention. Cost savings are effected by the method of this invention which allows for the application of mass production techniques in the formation of wall members as well as on-site fabrication of wall members.

It will be appreciated that the interior and exterior walls of a building structure according to this invention may be covered with a variety of walling materials to present any desired interior or exterior appearance.

It will be apparent to those skilled in the art that the principal objects of this invention have been accomplished. It further will be apparent that various changes and modifications may be made in the embodiments of this invention herein described without departing from the scope or spirit of the invention.

I claim:

1. An end connector adapted for insertion into an opening at one end of a hollow member, said connector presenting a general V-shape and providing two side panels, the side panels being joined at one end and open and separated at the other end, said side panels being resiliently movable upon pressure applied to the outside thereof to come together at said open end and upon release of pressure to separate from each other at said open end for ready insertion into said open end of said hollow member upon application of pressure to said side panels to bring said side panels together, the open end of each of said side panels being provided with means for engaging the inside of said hollow member when said connector is inserted within the opening of said end of said hollow member and the pressure released and each side panel of said connector being provided with a top notch and a bottom notch, said notches in each of said side panels being substantially the same size and in line, the notches in one of said side panels matching the notches in the other side panel of said connector.

2. An end connector in accordance with claim 1 wherein said means for engaging the inside of said hollow member when said connector is inserted within the opening of said end of said hollow member comprises a band fixed to the ends of each of said side panels at the open end thereof, said bands extending radially outwardly from the outside ends of each of said panels to form a semi-circle connecting the upper and lower outside edges of the open ends of each of said panels such that when pressure is applied to said panels to cause the open end of said panels to come together said bands at the open ends of said panels define a circular band.

3. A wall member comprising a hollow tubular structural member having affixed to at least one end the end thereof connector of claim 1.

4. A wall member according to claim 3, wherein the hollow tubular structural member comprises spirally wrapped steel sheet.

5. A wall member according to claim 3, wherein the hollow tubular structural member has a circular cross-section.

6. A wall member according to claim 3, wherein the hollow tubular structural member has an oblong cross-section.

7. A wall comprising a plurality of horizontally disposed superjacent wall members in accordance with claim 3 and means for fixing and retaining said wall members on at least one end.

8. A building structure comprising a pair of walls, each wall being comprised of a plurality of horizontally disposed wall members in accordance with claim 3 set one upon the other, said walls meeting in an angular abutting relationship and means for receiving and retaining the abutting ends of said wall members to form a corner.

* * * * *